J. H. ASTRUCK.
KNOCKDOWN STAND.
APPLICATION FILED DEC. 8, 1911.
1,043,387.
Patented Nov. 5, 1912.
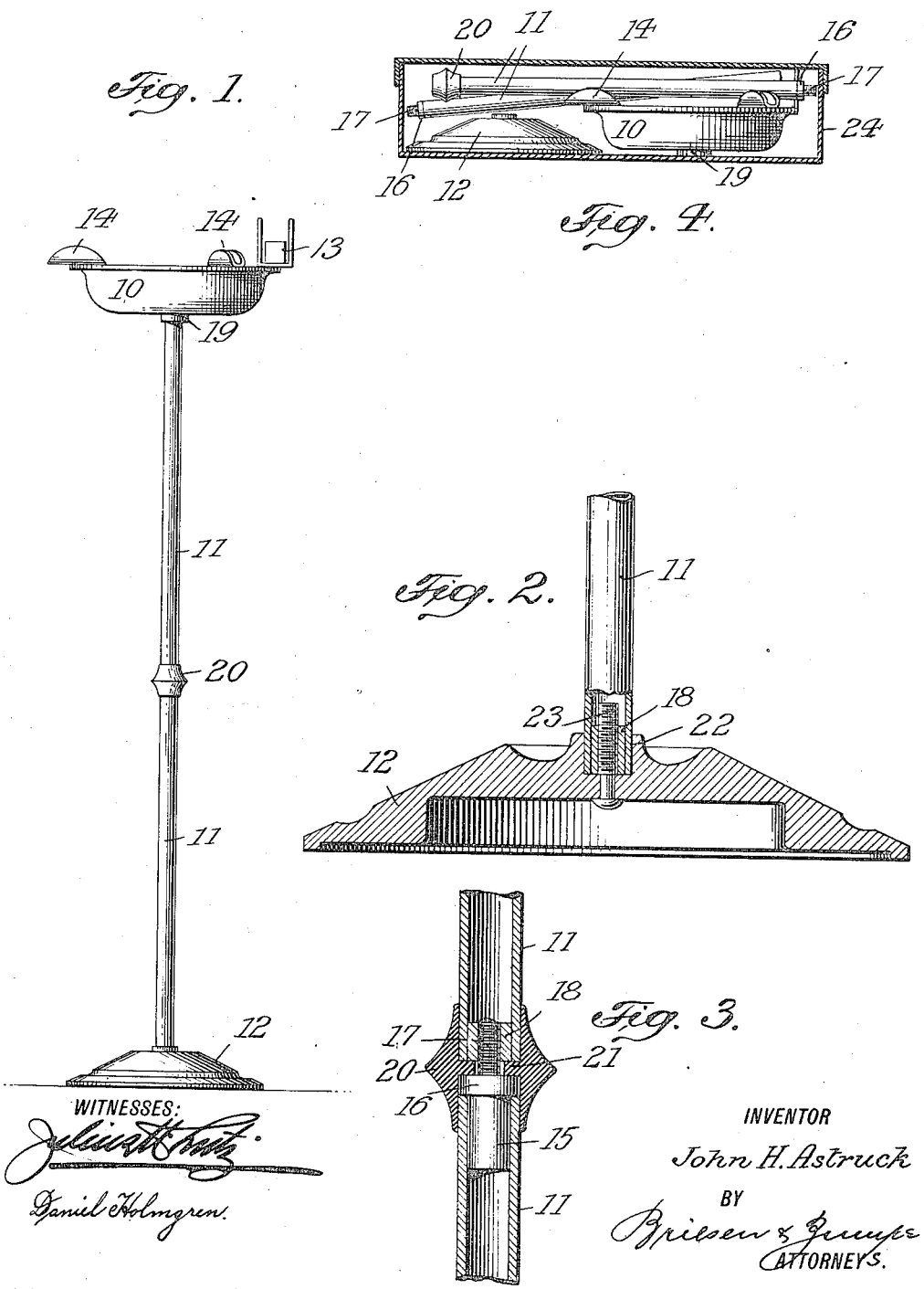
INVENTOR
John H. Astruck
BY
ATTORNEYS.

UNITED STATES PATENT OFFICE.

JOHN H. ASTRUCK, OF NEW YORK, N. Y.

KNOCKDOWN STAND.

1,043,387.  Specification of Letters Patent.  Patented Nov. 5, 1912.

Application filed December 8, 1911. Serial No. 664,620.

*To all whom it may concern:*

Be it known that I, JOHN H. ASTRUCK, a citizen of the United States, residing at New York city, county and State of New York, have invented a new and Improved Knockdown Stand, of which the following is a specification.

This invention relates to a knockdown stand of novel construction, which is readily adjustable in height, has invisible reinforced joints, and may be completely dismembered for packing and shipping purposes.

In the accompanying drawing: Figure 1 is a side elevation of a stand embodying my invention; Fig. 2 is a section through the base and lower joint; Fig. 3 a section through the joint between a pair of adjoining stem-members, and Fig. 4 a side view of the stand showing the same taken apart and inclosed within a casing.

The stand is composed essentially of a bowl 10, a suitable number of stem-sections 11 and a base 12.

The bowl 10 is made of suitable configuration and may be provided with a match box holder 13, cigar rests 14 or similar implements adapted for the convenience of a smoker.

Each stem section 11 is of tubular form and incloses within its upper end a plug 15 which is soldered into or otherwise secured to the tube. Plug 15 is provided with an integral collar 16 that rests upon the top of section 11 and is in turn provided with an upwardly extending screw 17. The diameter of collar 16 should be equal substantially to the outer diameter of stem 11, so as to be flush therewith as indicated in Fig. 3. At its lower end each stem section 11 is provided with a bushing 18 having a tapped aperture of a size to accommodate screw 17.

The screw 17 of the uppermost stem section is adapted to removably engage a socket 19 of bowl 10. At the joints between the several stem sections, there is arranged an outer tubular sleeve 20, of suitable configuration and provided with a central apertured web 21 interposed between the stem-sections. This web rests upon collar 16 of the lower stem section, and permits the passage of the screw 17 into engagement with the tapped bushing 18 of the upper stem section. The upper and lower halves of the sleeve will thus encompass the corresponding ends of stem sections 11, so that the joint between said sections is effectively reinforced and concealed.

The drawing shows the stand to be provided with two stem sections only, but it is obvious that this number may be increased at pleasure without departing from the spirit of my invention.

The base 12 is provided with an upper central socket 22 and with a fixed screw 23 extending upwardly into said socket. The lower end of the bottom stem section 11 is removably fitted into socket 22 and its tapped bushing 18 is engaged by screw 23, so that a very strong invisible joint is obtained.

It is obvious that the height of the stand may be readily changed by shortening or entirely removing the stem. Thus if the stem is composed of but two sections, its height may be altered by removing one of said sections, while if the stem is composed of more than two sections, any suitable number thereof may be withdrawn. So also the stand may be completely eliminated and the bowl secured directly to the base by causing the screw 23 of the latter to engage socket 19 of the former.

For packing and shipping purposes, the bowl, the stem-sections, and the base are all unscrewed from each other, so that the entire device may be confined within a small case 24 (Fig. 4).

It will be seen that my knockdown stand is of great strength, is not liable to wear loose at the joints, may be readily adjusted in height and may be easily packed, stored and shipped.

I claim:

1. A knockdown stand comprising a bowl, a base, a jointed stem composed of a plurality of removable sections, a plug fitted into one of the stem sections, a collar on said plug, a screw on the collar which is adapted to engage a tapped aperture of the adjoining stem sections, and a sleeve encompassing the stem sections and having an apertured web adapted to accommodate the screw.

2. A knockdown stand comprising a bowl, a base, a jointed stem composed of a plurality of removable sections, a plug fitted into one of the stem sections, a collar on said plug, a screw on the collar, a tapped bushing fitted into the other stem section and adapted to be engaged by the screw, and a sleeve encompassing the stem sections and having an apertured web adapted to accommodate the screw.

JOHN H. ASTRUCK.

Witnesses:
FRANK V. BRIESEN,
KATHERYNE KOCH.